(12) United States Patent
Mouchet et al.

(10) Patent No.: US 10,875,365 B2
(45) Date of Patent: Dec. 29, 2020

(54) PORTABLE TIRE PRESSURE MONITORING SYSTEM (TPMS) TOOL

(71) Applicant: ATEQ, Les Clayes sous Bois (FR)

(72) Inventors: Jacques Mouchet, Les Clayes sous Bois (FR); Pascal Keller, Les Clayes sous Bois (FR); Bruno Rousseau, Les Clayes sous Bois (FR)

(73) Assignee: ATEQ, Les Clayes sous Bois (FR)

( * ) Notice: Subject to any disclaimer, the term of this patent is extended or adjusted under 35 U.S.C. 154(b) by 128 days.

(21) Appl. No.: 16/110,608

(22) Filed: Aug. 23, 2018

(65) Prior Publication Data

US 2020/0062051 A1   Feb. 27, 2020

(51) Int. Cl.
*B60C 23/04* (2006.01)
*G01L 19/08* (2006.01)

(52) U.S. Cl.
CPC ........ *B60C 23/0479* (2013.01); *G01L 19/086* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 23/0493; B60C 19/00; B60C 23/04; B60C 23/0498; B60C 23/064; B60C 23/0488; B60C 23/0496; B60C 23/0408; B60C 23/041; B60C 23/0411; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003; B60C 23/004; B60C 23/02;
(Continued)

(56) References Cited

U.S. PATENT DOCUMENTS

| 7,250,852 B1 | 7/2007 | Kell |
| 2005/0061071 A1* | 3/2005 | Novikov ............. B60C 23/0432 73/146.5 |

(Continued)

FOREIGN PATENT DOCUMENTS

| EP | 3 293 019 A1 | 3/2018 |
| WO | 2017/102191 A1 | 6/2017 |

*Primary Examiner* — Andre J Allen
(74) *Attorney, Agent, or Firm* — Young Basile Hanlon & MacFarlane, P.C.

(57) ABSTRACT

A portable tire pressure monitoring system (TPMS) tool includes a tire sensor trigger device ensuring the TPMS tool is in close proximity to a TPMS tire sensor to trigger or awaken the sensor to emit measured tire data. In one example, a manually displaceable trigger signal contact device in the form of a push button is used. On manual displacement of the push button against the tire, the tool generates the tire sensor trigger signal. In another example, the tool includes a first power source in the form of a high density capacitor. In another example, a second power source in the form of a lithium button-type battery is used to selectively provide power or recharge the first power source between function cycles.

21 Claims, 5 Drawing Sheets

(58) Field of Classification Search
CPC ............ B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 2/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0457; B60C 23/0462; B60C 23/0467; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28; G01L 17/00; G01L 17/005; G01L 19/0645; G01L 19/147; G01L 1/16; G01L 1/18; G01L 7/187; G01L 9/0052; G01L 9/008
USPC ................................................ 73/146–146.8
See application file for complete search history.

(56) References Cited

U.S. PATENT DOCUMENTS

| | | | |
|---|---|---|---|
| 2008/0100430 A1* | 5/2008 | Kochie | B60C 23/0408 340/447 |
| 2008/0103718 A1* | 5/2008 | Miller | B60C 23/0408 702/108 |
| 2009/0021362 A1* | 1/2009 | Kochie | B60C 23/0408 340/442 |
| 2009/0267751 A1* | 10/2009 | Wittliff | B60C 23/0408 340/442 |
| 2013/0106596 A1* | 5/2013 | Mouchet | B60C 23/0472 340/445 |
| 2013/0145834 A1* | 6/2013 | Mouchet | B60C 23/0479 73/146.4 |
| 2014/0139332 A1* | 5/2014 | Mouchet | B60C 23/0479 340/442 |
| 2015/0054640 A1 | 2/2015 | Huang et al. | |
| 2018/0194176 A1* | 7/2018 | Bout | B60C 23/0471 |

* cited by examiner

PORTABLE TIRE PRESSURE MONITORING SYSTEM (TPMS) TOOL

TECHNICAL FIELD

This disclosure generally relates to tools for use with vehicle tire pressure monitoring systems (TPMS).

BACKGROUND

In 2007, the United States federal laws implemented and required most passenger vehicles to include a tire pressure monitoring system (TPMS) to monitor and alert drivers of low tire pressure which degrades vehicle efficiency, performance and improves safety.

One TPMS system is Direct TPMS. In Direct TPMS, a tire sensor is installed in the wheel, often the valve stem of pneumatic vehicle tire. These sensors are configured to monitor several conditions of the tire including: tire air pressure, tire temperature, wheel rotation speed and other conditions. The TPMS tire sensors themselves include a specific sensor identification code (ID) and are configured to receive electronic signals and send electronic signals wirelessly from inside the wheel to an electronic control unit or module (ECU) in the vehicle which typically is connected to alert signals in the instrument panel in the interior of the passenger compartment. If a wheel sensor detects a tire pressure or other condition in a tire that is above or below a predetermined level, the sensor transmits a signal that is received by the ECU and an audio/visual indication is triggered to alert the driver to the condition.

Typical TPMS tire sensors used with TPMS systems are mounted on the valve stem, strapped on the rim or they could also be mounted against the tire wall. The electronic module generally includes a small battery, a circuit board with communication antennas or coils (receive and transmit), an air pressure sensor, a temperature sensor, a rotation detection device or accelerometer, a programmable controller and a memory for storing the sensor specific ID and other information depending on the TPMS system and sensor capabilities.

As TPMS systems advance in capability and increased safety options are included by the vehicle original equipment manufacturers (OEMs), vehicles are capable of identifying or alerting of the specific tire that, for example, may have low tire pressure. These systems accomplish this through the vehicle ECU being initially programmed or calibrated to recognize each of the specific wheel sensors associated with a particular position on the vehicle, for example, driver side front or rear and passenger side front or rear. When a new vehicle is manufactured, this initial programming or calibration may take place in the vehicle assembly plant or at a later time before the vehicle is purchased or delivered to the end user.

When, for example, the tires on the vehicle are "rotated" and their positions on the vehicle changed as part of routine maintenance for longevity of tire life, it is important for the proper operation of the TPMS that the vehicle ECU be reprogrammed or relearned to take into account that the prior position of the tires, and associated tire sensors, has changed. Reprogramming may also need to take place where, for example in cold-weather climates, users may change to snow tires for the winter season which requires reprogramming of the ECU as different tires are installed on the vehicle. In other tire events, the TPMS tire sensor may be damaged or the battery power depleted which requires replacement.

Conventional TPMS sensors in the tires are typically powered by an internal battery. To increase sensor battery life, the TPMS sensors are often in a "sleep" mode, not actively transmitting tire data. When a reading of the TPMS sensor is needed, a TPMS tool is needed to "trigger" or awaken the sensor to induce the TPMS sensor to emit the measured tire data. This triggering of TPMS sensors is often used in vehicle service garages where technicians as part of a routine data or safety check of vehicles, will check the conditions of the tires through triggering the TPMS tire sensors with a TPMS trigger tool. Typical TPMS tire sensors are programmed to be triggered through receipt of a low frequency (LF) signal, typically 125 kilohertz (kHz). The tire sensor then wirelessly emits a data signal, typically at 315 or 433 megahertz (MHz) containing the measured data from the tire. Conventional, sophisticated TPMS tools will decode the received tire sensor signal, retrieve from tool memory the proper protocol to communicate with the particular vehicle ECU, and wirelessly send a recoded data signal to the vehicle ECU to reprogram or relearn the ECU with the new TPMS sensor information.

Triggering of the TPMS tire sensors traditionally required a special TPMS tool having trigger capabilities typically only purchased by vehicle service garages and used by service technicians that are trained to operate those specialized tools. These TPMS trigger functions were often included in tools that included advanced TPMS diagnostic functions, databases of makes, models and years of vehicles to identify the TPMS system in the vehicle, data signal decoding and coding programs, and other features. These multi-function TPMS tools are typically quite expensive costing over $1000 USD, well beyond what a typical vehicle owner would want to spend leaving only commercial vehicle service garages with these tools and capabilities. Examples of commercial TPMS diagnostic tools include the VT36 and VT56 manufactured by ATEQ SAS, assignee of the present invention.

In use, TPMS tools used for triggering TPMS tire sensors are portable, hand-held tools that are positioned in close proximity to the specific vehicle, and close to the specific tire including a TPMS tire sensor. Once positioned adjacent a tire having a TPMS sensor, an activation or trigger button is pushed on the tool keypad to emit the LF signal to trigger or awaken the TPMS sensor and induce emission of the measured tire metrics.

A common problem in high-volume, commercial vehicle service garages is that several vehicles may be positioned in close proximity to one another in adjacent service bays in the garage. If the TPMS trigger tool is positioned close to more than one vehicle, on pressing the TPMS tool activation button, the LF trigger signal may be received by tires of several different vehicles which will all emit tire sensor data which may be confusing to the technician. A common practice is for the TPMS trigger tool to have a very limited range for the LF signal, for example 10-20 centimeters (cm), so the TPMS trigger tool has to be within that short distance to a tire sensor for the sensor to receive the LF trigger signal. Still, use of the TPMS trigger tool by new, inexperienced or careless service technicians, or a non-technician vehicle owner, can result in triggering and receiving data from several tires and/or possibly from multiple vehicles. Alternately, if the trigger sensor signal is too low or weak, the TPMS tire sensor may not be triggered and the technician may believe the tool is not functioning properly or the battery power source is depleted.

Often, service garages will charge a fee to trigger the TPMS sensors and reprogram or relearn the vehicle ECU even though the vehicle user/owner is capable of rotating or changing the vehicle tires without the service garage's service. One drawback or disadvantage of developing an aftermarket or end user TPMS trigger tool for vehicle owner use is the TPMS tools are typically battery powered so a user can move around the vehicle and place the TPMS trigger tool in close proximity to each vehicle tire. In order to generate the LF trigger signal, a relatively strong and robust battery is needed, for example a 9 volt battery. Further, having to trigger the TPMS sensors and reprogram the vehicle ECU is not a common occurrence for most end users. For example, rotating tires or changing to snow tires may occur only once per year, or once every several years when tires are worn and need to be replaced. Traditional alkaline batteries typically have shelf lives of only 2-5 years and are prone to leakage over long periods of time. Conventional alkaline batteries are also subject to extreme temperature changes which can significantly reduce shelf life and/or degrade performance. Further, when an alkaline battery leaks, it can ruin the electronic device.

It would be beneficial to solve or improve on one or more of these disadvantages and drawbacks.

SUMMARY

In one example, the portable tire pressure monitoring system (TPMS) tool includes a housing, a first power source, a TPMS tire sensor signal generator, an antenna in communication with tire sensor signal generator, and a tire sensor trigger or activation device. In one example, the tire sensor trigger device includes a trigger signal contact device which is activated when a predetermine portion of the TPMS tool is placed in physical contact with a predetermined object, for example the vehicle tire. This forces a user to have the tool in very close proximity, for example the tool physically touching the vehicle tire, in order to initiate the tire sensor trigger signal from the tool.

In another example, the trigger signal contact device includes a manually displaceable tire push button that is engaged with the antenna. In one aspect, the tire push button is positioned on the end of the antenna that extends externally from the TPMS tool housing. On physical contact and manual displacement of the tire push button with the vehicle tire, the tire sensor trigger signal generator generates the tire sensor trigger signal. In another example, the push button is positioned at the base of the antenna. On physical contact of the antenna with the vehicle tire, the push button is manually displaced signaling the tire sensor trigger signal generator to generate the tire sensor trigger signal for transmission through the antenna.

In an alternate example, a non-contact sensor detects when the TPMS tool is in close proximity to an object, for example a vehicle tire. When a predetermined distance is detected, the sensor sends a signal to the tire sensor trigger signal generator which generates the tire sensor trigger signal for transmission through the antenna. In one example the sensor is a manually displaceable push button as described. In other aspects, optical devices for example lasers, may be used to detect the distance between the tool and vehicle tire or ECU. The sensor and trigger signal activation devices may be used to trigger or send TPMS data signals to other vehicle components and controllers, for example vehicle electronic control units (ECUs).

In one example of a method for generating a TPMS tire sensor trigger signal includes detecting a predetermined close distance between the TPMS tool and a vehicle component, for example a vehicle tire. When the predetermined close distance is achieved, signaling the TPMS tire sensor trigger signal generator to generate the tire sensor trigger signal. In one example the predetermined close distance is detected through manually displacing a tire sensor trigger device through direct contact with the vehicle tire. In one example the tire sensor trigger device is a manually displaceable push button engaged with the TPMS tool antenna.

In one example of a TPMS tool, a first internal power source is a capacitor instead of a traditional battery. In one example, the capacitor may be a high density capacitor that has a capacitance range of 10 farad (F) to 50 F. In another example, The TPMS tool may further include a second power source that is electrically coupled to the power source. The second power source may be configured to recharge the power source when the first power source has been depleted. Alternatively, or in addition to, the second power source may be configured to recharge the power source when the TPMS sequence, for example triggering the set of four vehicle tire sensors, has been completed. In one example, the second power source is a lithium button-configured battery.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
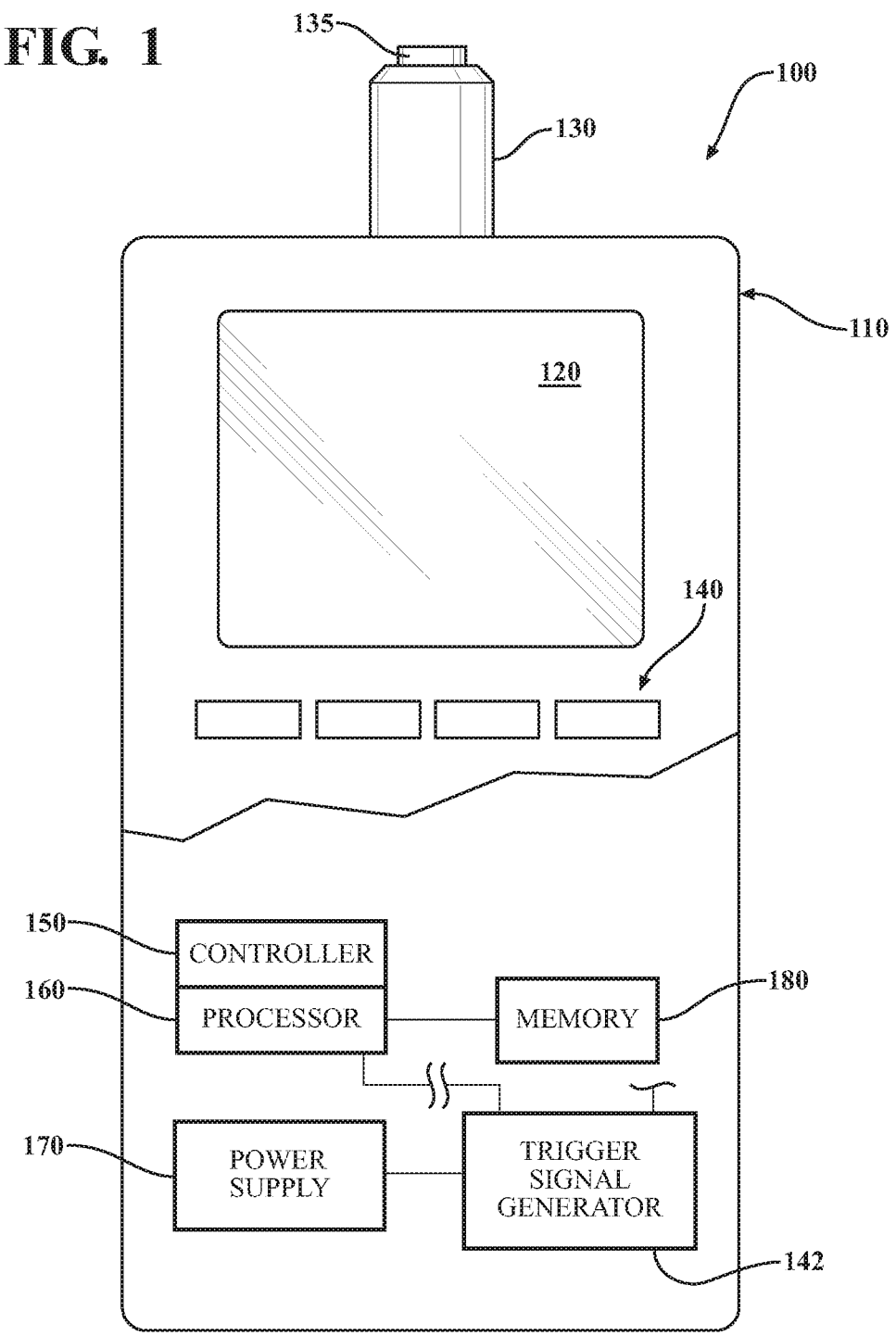
FIG. 1 is a partially cut-away illustration of an example TPMS tool including a TPMS tire sensor trigger device in the form of a tire push button.
Figure 2:
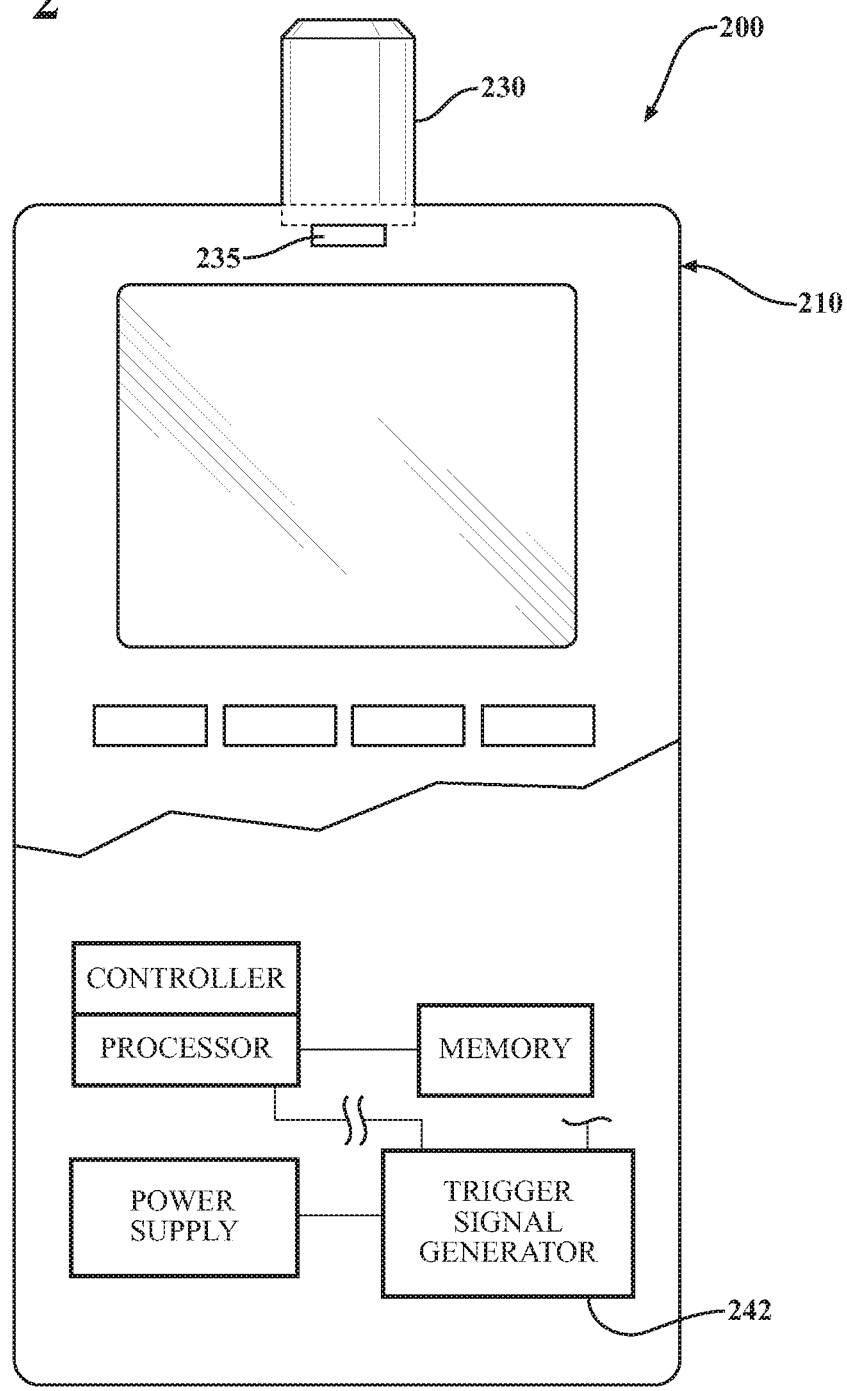
FIG. 2 is a partially cut-away alternate configuration of a TPMS tool shown in FIG. 1.
Figure 3:
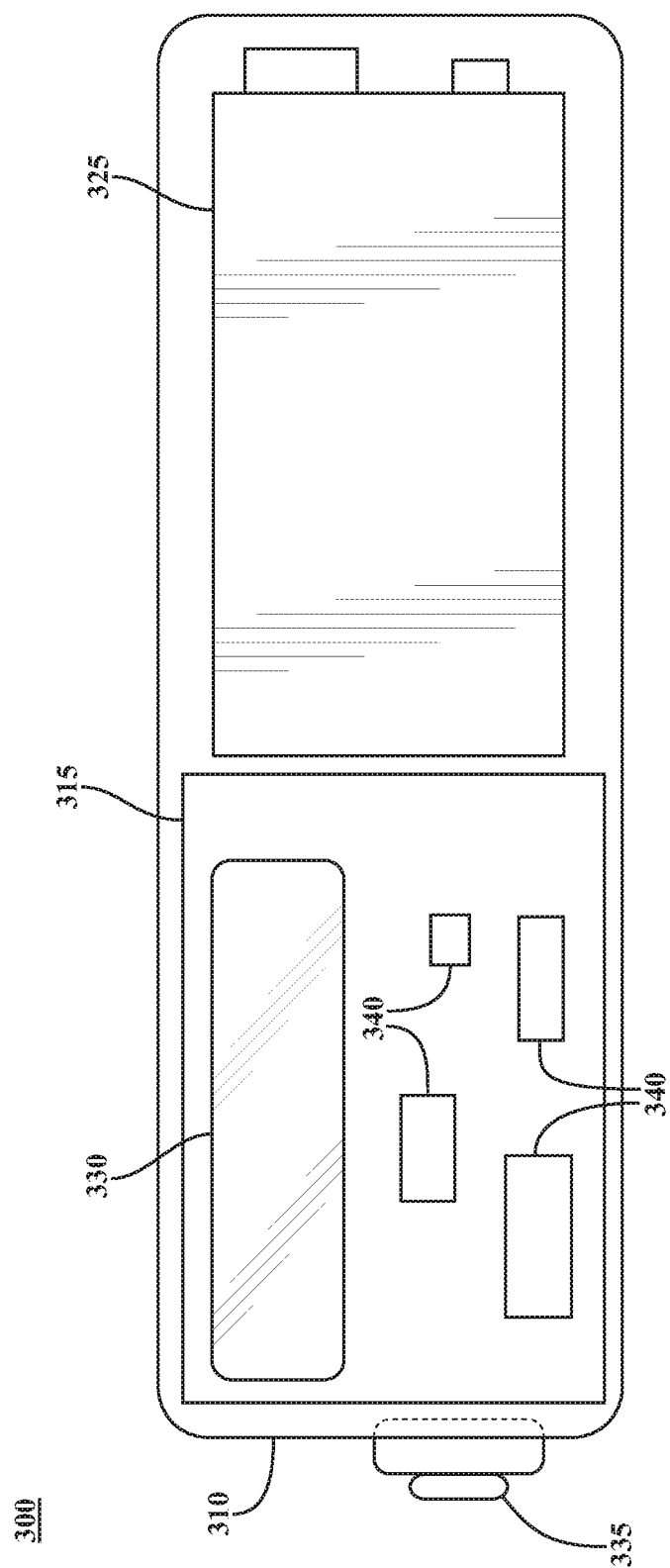
FIG. 3 is a cut-away alternate configuration of a TPMS tool including a tire sensor trigger device in the form of an alternate tire push button.

Referring to FIGS. 1-3 several examples of a TPMS tool 100 with a tire sensor trigger device in the form of a manually displaceable trigger contact device push-button (or activation button) is illustrated. Referring to FIG. 1, a TPMS tool 100 includes a housing 110, a display 120, an antenna 130, one or more push buttons and/or indicator lights 140, a trigger signal generation device 142 and an optional push-button keypad (not shown). The display 120 may be a liquid crystal display (LCD), a light emitting diode (LED) display, an organic light emitting diode (OLED) display, or any other type of display for visually depicting data, for example help/guide menus, vehicle information, the tire metrics and information. The display 120 may be a touch-sensitive display configured to receive touch-based input from a user. Non-limiting examples of the touch display technologies that may be used in display 120 include resistive panels, capacitive panels (surface capacitance, projected capacitance, mutual capacitance, or self-capacitance), surface acoustic wave, infrared grid, infrared acrylic projection, optical imaging, dispersive signal technology, and acoustic pulse recognition. Exemplary tool 100 includes an internal power supply 170 connected to a controller 150, a microprocessor 160 and a memory storage device 180. Power supply 170 may be conventional batteries, a rechargeable battery, and/or other internal power devices, for example a first power supply in the form of a high-density capacitor as described below.

Referring to FIG. 1, the antenna 130 may include a coil and is configured to communicate, send and receive, with the TPMS tire sensors and a vehicle controller, such as an ECU, which is in data communication with a TPMS tire sensor installed in a pneumatic tire or a wheel of the vehicle. In the example, antenna 130 is a low frequency (LF) antenna. Other antennas for transmitting and receiving other frequencies and signals known by those skilled in the art may be used. In a typical application, TPMS tool 100 is used to transmit, receive and process wireless electronic data with a TPMS system installed in a vehicle by transmitting and receiving modulated or pulsed (continuous) wave signals. Whenever information is coded or decoded in the form of a modulated signal, an algorithm such as Manchester ASK or other type may be used in accordance with a corresponding TPMS system communication protocol specification and implemented using the microprocessor 160 and a memory storage device 180. It is understood that the housing 110, display 120, antenna 130, and indicator lights 140, and communication protocols can take different configurations, forms and functions.

In the example configuration shown in FIG. 1, the tire sensor trigger device is a manually displaceable trigger signal contact device in the form of a tire push button 135. The exemplary tire push button 135 is located at the distal tip of the antenna 130. The tire push button 135 is in communication with a tire sensor trigger signal generator 142 which is operative to selectively generate and send an electrical signal to the antenna 130 to generate the proper wireless trigger signal to activate or awaken the particular TPMS tires sensors for that vehicle in order to emit the measured tire metrics. In one example to generate and send a TPMS tire sensor trigger signal to a TPMS tire sensor, the user may activate tire push button 135 by pressing the antenna 130, and therefore the tire push button 135, in direct physical contact against the side wall of the desired tire. Upon manual displacement of the tire push button 135 a signal is sent to the TPMS tire sensor trigger signal generator to generate the tire sensor trigger signal for transmission by the antenna 130.

In one example, on manual displacement of the tire sensor trigger device, for example push button 135, a signal is sent to the controller 150 and processor 160 to generate a predetermined and stored in memory 180 sequence of pre-programmed software and hardware steps/functions internal to the tool 100 to generate the TPMS tire sensor trigger signal through tire trigger signal generator 142. For example, the user or technician will input the vehicle make, model and year of manufacture into the tool 100 through the tool keypad, by scanning the vehicle VIN number or by other methods. The tool 100 will through internal stored database of vehicles, determine the make or type of TPMS tire sensors used with that specific vehicle and determine the proper communication protocol and/or instructions needed for the tire sensor trigger signal generator to generate the trigger proper signal to communicate and activate that type of TPMS sensor to emit the measured tire metrics, for example internal tire air pressure.

The tool 100 antenna 130 then wirelessly transmits an LF signal to the TPMS tire sensor of the desired tire. The TPMS tire sensor responds and transmits a wireless data signal to the TPMS tool 100 where it is received at antenna 130. Since the exemplary trigger push button 135 is activated by direct contact with the desired tire, the LF signal transmitted by the antenna 130 is transmitted only to the TPMS sensor of the particular tire. Accordingly, the TPMS tool 100 will not send or receive any undesired signals from other vehicles or tires sensors in the immediate area.

In one example, tool 100 antenna 130 can be used to send a signal to the vehicle ECU with information to update and relearn/reprogram the ECU by a stored in tool 100 memory 180 through a predetermined communication protocol in a similar manner as that described for the TPMS tire sensor. Other information sensed or measured by the TPMS tire sensor may be transmitted by the sensor to the tool 100 and/or ECU, for example tire pressure and temperature, or diagnostic information of the sensor, for example sensor battery life, depending on the sophistication of the sensor.

In one example (not shown), the tire sensor trigger device may be in the form of a non-contact sensor, for example an optical sensor (not shown), to measure a distance between the tool 100 and a vehicle tire or ECU. In the example, the tire sensor trigger device may include an optical sensor, for example a laser sensor, to measure a distance between the tool 100 and the tire. In one example, a predetermined distance may be stored in memory 180. On the sensor and processor 160 calculating the measured distance and comparing the measured distance to the predetermined distance stored in memory, tool 100 will determine that the predetermined distance between the tool 100 and the vehicle tire is achieved for a proper and successful transfer of signals, for example a TPMS tire sensor trigger signal. Other sensors and processes to ensure the tool 100 is within a predetermined distance from the tire to avoid problems, for example sending and receiving TPMS tire sensor signals from other tire sensors or vehicles, can be used.

Referring to FIG. 2, another example of a TPMS tool 200 including an alternate configuration of a tire sensor trigger device in the form of a push button 235 is shown. Where components and functions described for tool 100 in FIG. 1 are used, those components and functions will not be repeated for tool 200 in FIG. 2.

In this example, a TPMS tire push button 235 is included at the base of the antenna 230 positioned inside housing 210. Alternatively, the base of the antenna 230 and the tire push button 235 may be located outside the housing 210. In yet another alternative not shown, the base of the antenna 230 may be located outside the housing 210 and the tire push button 235 may be located inside the housing 210. Alternate positions and configurations may be used, for example, as shown in FIG. 3 below. Tool 200, antenna 230, tire sensor trigger signal generator 242, and tire push button 235 are used to trigger TPMS tire sensors, and may further be used to communicate with the vehicle ECU, as described for tool 100.

Referring to FIG. 3, an alternate TPMS tool 300 with an alternately-configured TPMS tire sensor trigger push-button 335 is shown. Where components and functions described for tool 100 in FIG. 1 are used, those components and functions will not be repeated for tool 300 in FIG. 3. In the example, TPMS tool 300 includes a smaller in size housing 310 which further includes external control push buttons and an indicator lights (not shown) versus a full keypad and display screen disclosed for tools 100 and 200. It is understood the housing 310 may be the same or similar to tools 100 and 200, and include a display screen, keypad and other components and functions as previously described.

Exemplary tool 300 includes a printed circuit board (PCB) 315 and a power source 325. The power source 325 may be a conventional battery, a rechargeable battery, and/or other internal power devices including those described in further detail below.

The PCB 315 includes an internal antenna 330 and one or more electronic components 340. The electronic components 340 may include a microprocessor, a controller, a data/instruction memory storage device, and trigger signal generator generally described for tools 100 and 200. In this example, the tire sensor trigger device is in the form of a manually displaceable trigger signal contact device in the form of a tire push button 335 located on an external surface of the TPMS housing 310. The tire push button 335 is electrically coupled to the PCB 315 and the tire sensor trigger signal generator and is further configured to communicate with the antenna 330 and one or more electronic components 340.

As shown in the FIG. 3 example, the antenna 330 may include a magnetic coil and is configured and controlled to communicate with the TPMS tire sensors and the vehicle ECU as previously described for tools 100 and 200. Other antennas for transmitting and receiving other frequencies and signals known by those skilled in the art may be used. It is understood that the PCB 315, power source 325, antenna 330, electronic components 340 including a trigger signal generator, and push button 335 can take different configurations, forms and functions.

In the examples shown and described in FIGS. 1-3 the manually displaceable trigger signal contact device may take other forms than a push button as described. Other devices may include a displaceable toggle switch, a roller device, or other physically displaceable devices which when moved or displaced through physical contact with an object, for example a tire, can generate a signal to the tire sensor trigger signal generator.

In another aspect not shown, the manually displaceable signal contact device may be used in cooperation with a housing key pad button. For example, the tire push button 135, 235, 335 may first be pushed/activated through engagement with the vehicle tire and then a housing keypad button on the housing or display, may be pushed/activated to signal the trigger signal generator 142, 242 to generate the tire sensor trigger signal for transmission by the antenna. In the example, only on engagement of the tire push button 135, 235, 335 and the user pushing the keypad button, will the signal be sent to the trigger sensor generator 142, 242. Internal circuitry, logic and controls to require both be actuated in order to generate the tire sensor trigger signal may be included as known by those skilled in the art.

In the examples shown and described in FIGS. 1-3, the use of the tire sensor trigger device, for example a tire push button, is not limited to sending TPMS tire sensor trigger signals to the tire sensors. For example, a function activation device, for example in the form of a push button or optical distance measuring device, may be used for the tools 100, 200 and 300 to communicate with the vehicle ECU or other vehicle components where similar problems may be resolved or improved by ensuring the TPMS tool is in close proximity to the vehicle component it is communicating with.

Figure 4:
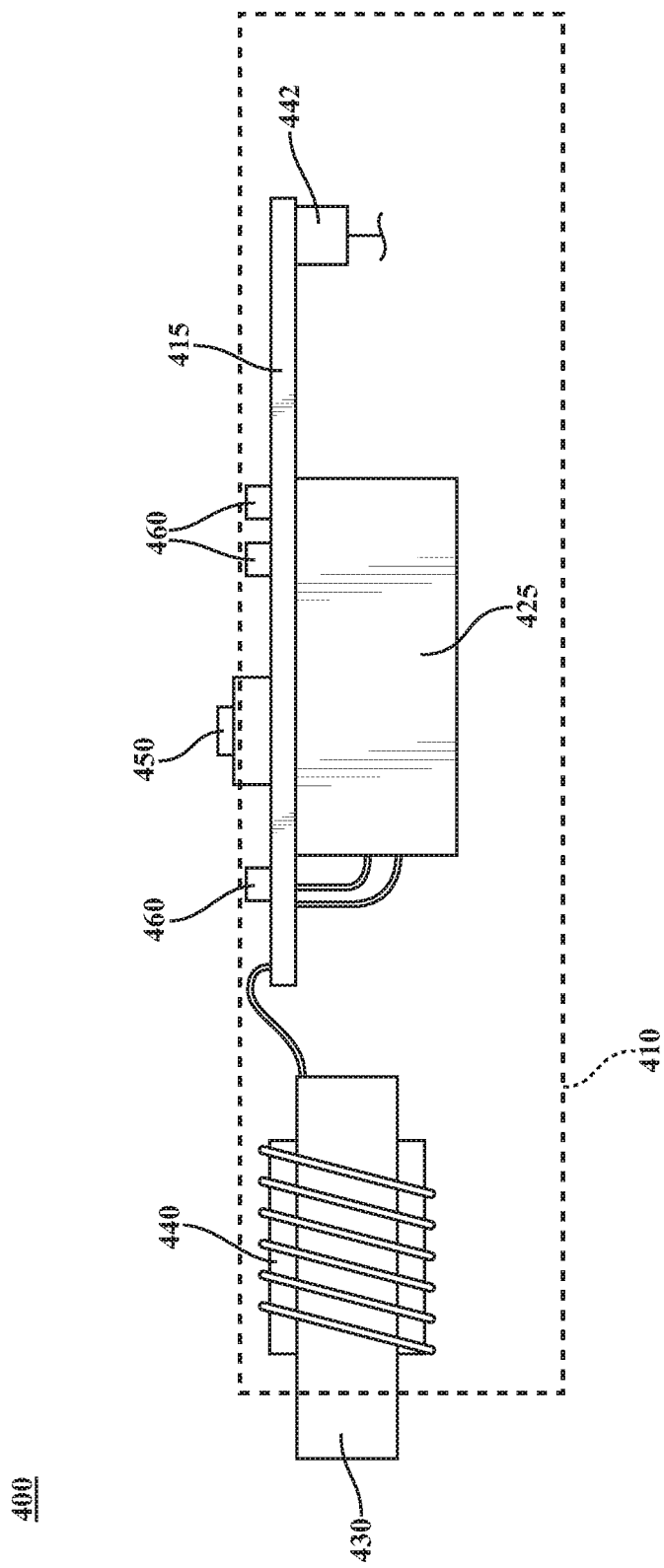
FIG. 4 is side-view cut-away example of a TPMS tire sensor trigger tool including a capacitor first power source.

Referring to FIG. 4, an alternate TPMS tool 400 having an alternate field or use application and a power source is shown. In the FIG. 4 example, tool 400 is smaller in size, and is less sophisticated or has reduced TPMS features or capabilities than tools 100, 200 and 300. For example, exemplary tool 400 does not include a large visual display and provides visual indicators through simple LED lights 460 or other simple, low cost visual indicators. The example tool 400 further does not include TPMS data signal decoding or encoding capabilities and does not reprogram or relearn vehicle ECUs by use of the tool 400 alone. A useful, but not exclusive, application for tool 400 is by vehicle owners or end users as a TPMS tire sensor trigger tool only, for example, when an end user rotates his/her own tires or changes from three season tires to winter tires.

A vehicle owner may initiate an ECU relearning process. For example, the vehicle owner may initiate the ECU relearning process manually, following a predefined sequence with the brake pedal, parking brake, ignition key, ignition push button, and/or any other accessible item that the vehicle owner can access. The predefined sequence may vary depending on the vehicle brand. In another example, the vehicle owner may initiate the ECU relearning process using an external device that is configured to activate the ECU relearning process for vehicles that do not support manual entry.

Referring again to FIG. 4, the alternate TPMS tool 400 includes a housing 410, a PCB 415, a trigger signal generator 442, and a first power source 425. In this example, the PCB 415 is electrically coupled to an antenna 430. The antenna 430 may be a magnetic cylinder that is wrapped with a coil 440. The coil 440 may be made of copper and/or any suitable conductive material. In this example, a function button 450 is located on an external surface of the housing 410. The function button 450 is electrically coupled to the PCB 415 and is configured to communicate with the antenna 430. The PCB 415 includes one or more visual display or indicator devices, for example LEDs 460.

In the FIG. 4 example, the antenna 430 includes a coil 440 and is configured to communicate with TPMS tire sensors to trigger or awaken the TPMS tire sensors on use of the function button only without a dedicated tire sensor trigger device, for example a manually displacement trigger contact device push button. In the example, antenna 430 is an LF antenna. The antenna 430 may be configured to transmit at approximately 125 KHz. Other forms of antennas or receivers for respectively transmitting and receiving other frequencies and signals known by those skilled in the art may be used. In an example, the antenna 430 may be a resonating circuit using the coil 440 connected to a capacitor. The coil may have an electrical inductance value of approximately 150 H. In this example, the capacitor and the coil 440 may have an intrinsic resonating frequency as close as possible to 125 KHz.

It is understood that tool 400 may include some or all of the components, features or functions previously described for tools 100, 200 and 300. It is further understood that tool 400 may also be used by professional vehicle service garages and trained technicians.

In the FIG. 4 example, first power source 425 is a capacitor, for example a 25 farad (F) (3 V) high density capacitor. An example high density capacitor that may be used as the first power source 425 may be a VISHAY 20 F 2.7V high density capacitor. The power source 425 exemplary capacitor may have a capacitance range between 10 F and 50 F. The first power source 425 may be quickly charged using a universal serial bus (USB) port and/or a 12V vehicle port such as an electrical accessory or cigarette lighter port/outlet. In one example, the first power source 425 capacitor can be charged in a range of 20 seconds (s) to 2 minutes (min). In one aspect, sufficient energy would be accumulated and stored by the first power source 425 capacitor to trigger at least four TPMS tire sensors of the vehicle. In one example, the first power source capacitor 425 is 16 millimeters (mm) wide and 30 millimeters (mm) long.

First power source 425 in the form of the described capacitor may have other capacitive values or ranges, charging time periods, physical sizes or configurations, and other performance capabilities to suit the particular use application or performance specification.

The first power source 425 in the form of the described capacitor includes the advantages of not being subject to significant power loss or performance degradation due to extreme temperatures or aging, as seen in conventional disposable or rechargeable batteries. The first power source 425 capacitor further has a smaller footprint or packaging space requirement in the housing 410 than a conventional battery, therefore the size of the TPMS device 400 may be substantially reduced. For example, the size of the TPMS device 400 may be reduced to easily fit inside the glovebox of a typical consumer vehicle. In use, after a prolonged period of non-use, for example 1-10 years, a vehicle owner may remove tool 400 from a vehicle glove box, place the tool 400 in close proximity to each tire, generate a tire sensor trigger signal for transfer through antenna 430 to trigger the TPMS tire sensors as generally described for tools 100, 200 and 300 (without manually displaceable trigger contact device). Although the first power source 425 in the form of the described capacitor is shown in the alternate tool 400, it is understood first power source 425 in the form of a capacitor may be implemented in any of the tools 100, 200, 300 or other embodiments or variations disclosed herein.

Figure 5:
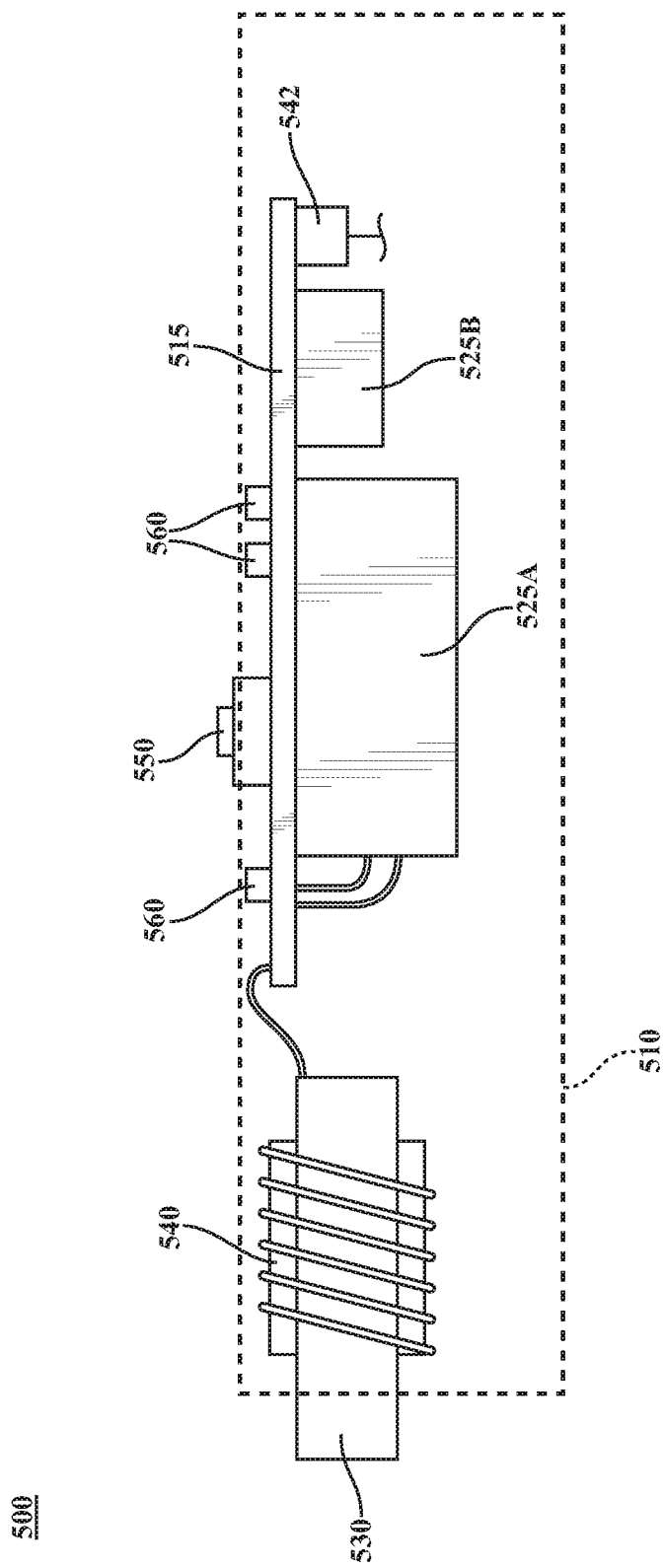
FIG. 5 is side-view cut-away alternate example of FIG. 4 including a second power source.

Referring to FIG. 5, an alternate example of TPMS tool 400 described above is shown as TPMS tool 500. The TPMS tool 500 includes a housing 510, a PCB 515, a tire sensor trigger signal generator 542, a first power source 525A, and a second power source 525B. In this example, the PCB 515 is electrically coupled to an antenna 530 and a push button 550 which are electrically connected to one another, and are constructed and function, in the manner previously described for antenna 430 and push button 450. The PCB 510 includes one or more LEDs 560 as previously described for LED's 460. It is understood that the housing 510, PCB 515, antenna 530, coil 540, tire sensor trigger generator 542, and push button 550 can take different configurations, forms and functions.

In the FIG. 5 example TPMS tool 500, the first power source 525A is a capacitor as previously described for tool 400 first power source 425 capacitor. The second power source 525B may be a rechargeable lithium-based battery and is used to recharge the first power source 525A capacitor between TPMS tire sensor trigger cycles. A cycle may include a TPMS tire sensor trigger sequence for each of at least four tires of a vehicle (i.e. triggering all four TPMS tire sensors represents a single trigger cycle).

The second power source 525B may be a lithium button cell-type battery, for example those similar to wrist watch or similar batteries. The exemplary lithium button cell-type batteries typically have long duration shelf-life and the performance does not degrade due to severe environmental changes similar to first power source 425 and 525A. In addition, or as an alternative, to being charged by the second power source 525B, the first power source 525A may be quickly charged using a USB port or other vehicle accessory power sources described for tool 400. Second power source 525B may be other types of batteries having characteristics of relatively high power, and long duration life without significant degradation due to environmental factors as described above.

In one example, sufficient energy would be accumulated by the first power source 525A capacitor to trigger at least four TPMS tire sensors of the vehicle. After a completed cycle, or upon power depletion of the first power source 525A, the second power source 525B is used to charge the first power source 525A. In one example, tool 500 PCB 515 includes preprogrammed and stored in memory instructions in a memory storage device (not shown) and a controller and microprocessor (not shown) to automatically direct the second power source 525B to charge the first power source 525A when the first power source 525A is depleted or when a predetermined condition occurs. Alternately, a toggle switch or button (not shown) can be used to activate or start a charging cycle for the second power source 525B to charge the first power source 525A as generally described above. In one example, housing 510 includes a battery access door so second power source 525B could be replaced or a port (not shown) for recharging second power source 525B.

Although the first 525A and second 525B power sources in the form of the respectively described capacitor and a lithium-based battery are shown as useful in TPMS tool 500, it is understood the first 525A and second power source 525B may be implemented in any of the tools 100, 200, 300, 400 or other embodiments or variations disclosed herein.

While the invention has been described in connection with certain embodiments, it is to be understood that the invention is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law. One or more elements of the embodiments disclosed may be combined with one or more elements of any other embodiment disclosed.

What is claimed is:

1. A portable tire pressure monitoring system (TPMS) tool comprising:
   a housing;
   a first power source positioned in the housing;
   a TPMS tire sensor trigger signal generator positioned in the housing and in communication with the power source;
   an antenna in communication with the trigger signal generator, the antenna operable to transmit the TPMS tire sensor trigger signal; and
   a tire sensor trigger device comprising a manually displaceable push button engaged with the antenna and in communication with the trigger signal generator, wherein the TPMS tire sensor trigger signal generator is operable to generate the TPMS tire sensor trigger signal on displacing activation of the push button.

2. The TPMS tool of claim 1 wherein a portion of the antenna is located external to the housing and the push button comprises a tire push button, the tire push button positioned on a distal tip of the antenna, wherein on direct physical contact of the tire push button to a vehicle tire, the TPMS tire sensor signal generator generates the TPMS tire sensor trigger signal.

3. The hand-held tire pressure monitoring tool of claim 1, wherein the push button comprises a tire push button, the tire push button is positioned at a base of the antenna, wherein on direct physical contact of the antenna to a vehicle tire, the antenna actuates the tire push button thereby causing the TPMS tire sensor trigger signal generator to generate the TPMS tire sensor trigger signal.

4. The hand-held tire pressure monitoring tool of claim 3, wherein the base of the antenna and the tire push button are positioned internal to the housing.

5. The TPMS tool of claim 1, wherein the first power source is a high-density capacitor.

6. The tool of claim 1 wherein the push button comprises a tire push button, the tire push button is directly adjacent to and directly engaged with the antenna.

7. A method for generating a tire pressure monitoring system (TPMS) tire sensor trigger signal with a TPMS tool having a tire sensor trigger generator and an antenna in communication with the tire sensor trigger generator, the method comprising:
   positioning the TPMS tool adjacent to a vehicle tire having a TPMS tire sensor;
   detecting a predetermined close distance between the TPMS tool and the vehicle tire;
   signaling the TPMS tire sensor trigger generator that the predetermined close distance between the TPMS tool and vehicle tire is satisfied;
   generating the tire TPMS tire sensor trigger signal by the TPMS tire sensor trigger generator; and
   transmitting the generated TPMS tire sensor trigger signal through the antenna.

8. The method of claim 7 wherein detecting the predetermined close distance between the TPMS tool and the vehicle tire comprises:
   manually displacing a TPMS tire sensor trigger device through direct physical contact between the TPMS tool and the vehicle tire.

9. The method of claim 8 wherein manually displacing a TPMS tire sensor trigger device further comprises:
   axially displacing a push button engaged with a TPMS tool antenna.

10. The method of claim 7 wherein detecting the predetermined close distance between the TPMS tool and the vehicle comprises:
    measuring a distance between the tool and the vehicle tire through an optical device connected to the tool;
    comparing the measured distance with the predetermined close distance; and
    determining whether the measured distance is less than or equal to the predetermined close distance.

11. A portable tire pressure monitoring system (TPMS) tool comprising:
    a housing;
    a first power source comprising a high-density capacitor positioned in the housing;
    a TPMS tire sensor trigger signal generator positioned in the housing and in communication with the power source;
    an antenna in communication with the trigger signal generator, the antenna operable to transmit the TPMS tire sensor trigger signal; and
    a tire sensor trigger device in communication with the trigger signal generator, wherein the TPMS tire sensor trigger signal generator is operable to generate the TPMS tire sensor trigger signal on activation of the tire sensor trigger device.

12. The TPMS tool of claim 11, wherein the high-density capacitor has a capacitance range of 10 farad (F) to 50 F.

13. The TPMS tool of claim 12, wherein the high-density capacitor has a capacitance of 25 F.

14. The TPMS tool of claim 11 further comprising:
    a second power source electrically coupled to the first power source.

15. The TPMS tool of claim 14, wherein the second power source is operable to charge the first power source on one of a condition that the first power source is depleted or on a condition subsequent to the generation of the TPMS tire sensor trigger signal by the TPMS tire sensor trigger generator.

16. The TPMS tool of claim 15, wherein the second power source comprises a lithium button cell battery.

17. The TPMS tool of claim 14 wherein the second power source is positioned completely within and enclosed by the housing.

18. A portable tire pressure monitoring system (TPMS) tool comprising:
    a housing;
    a first power source positioned in the housing;
    a TPMS tire sensor trigger signal generator positioned in the housing and in communication with the power source;
    an antenna in communication with the trigger signal generator, the antenna operable to transmit the TPMS tire sensor trigger signal; and
    a tire sensor trigger device comprising a non-contact sensor in communication with the trigger signal generator, the non-contact sensor operable to detect a distance between the tool and a predetermined vehicle component without physical contact with the predetermined vehicle component, wherein the TPMS tire sensor trigger signal generator is operable to generate the TPMS tire sensor trigger signal on a determination that the detected distance is within a predetermined distance.

19. The tool of claim 18 wherein the non-contact sensor is an optical sensor.

20. The tool of claim 19 wherein the optical sensor comprises a laser sensor.

21. The tool of claim 19 wherein the first power source comprises a high-density capacitor.

* * * * *